Aug. 27, 1929. T. G. LE CLAIR 1,726,077
BUS CONSTRUCTION
Filed March 26, 1927    2 Sheets-Sheet 1
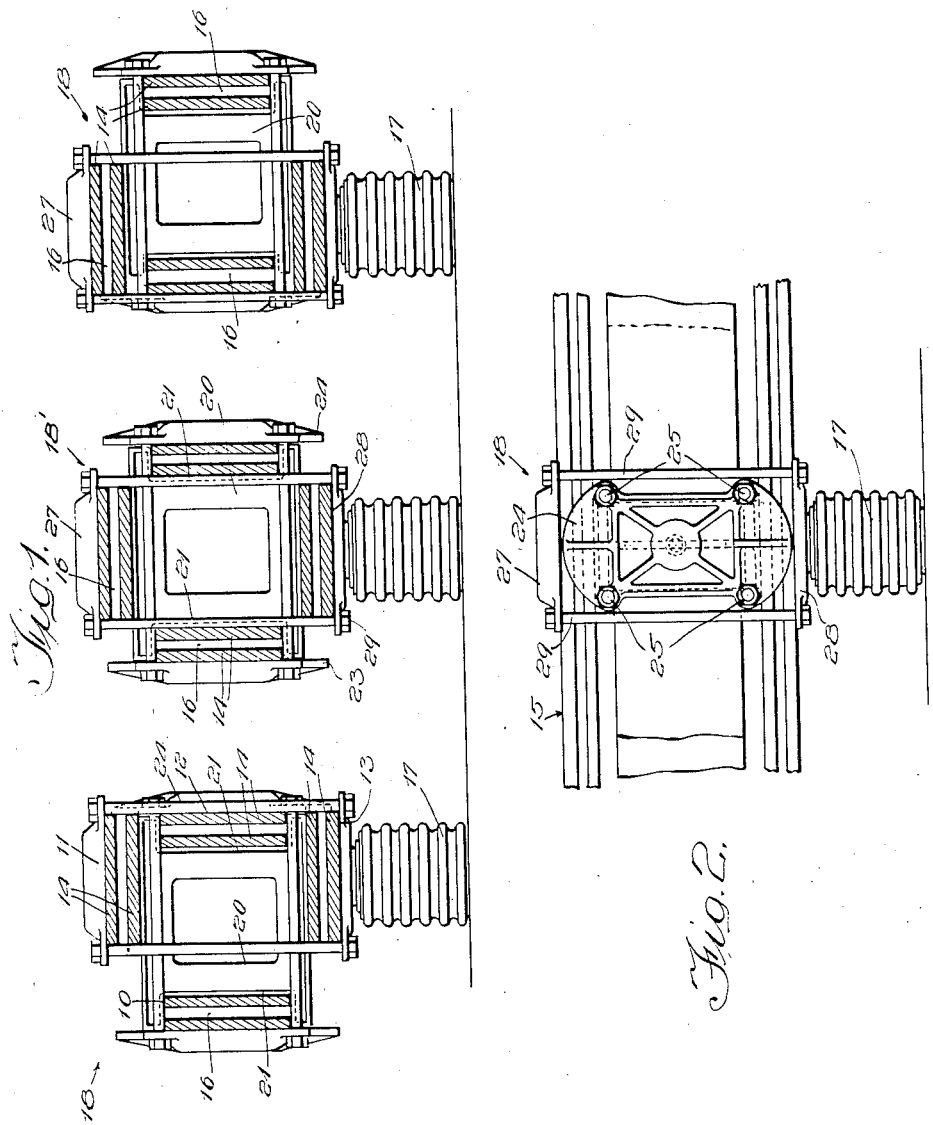

Aug. 27, 1929.　　T. G. LE CLAIR　　1,726,077
BUS CONSTRUCTION
Filed March 26, 1927　　2 Sheets-Sheet 2
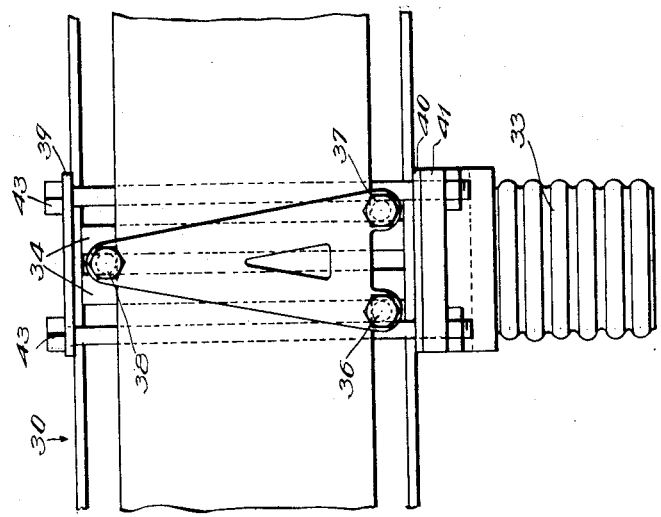
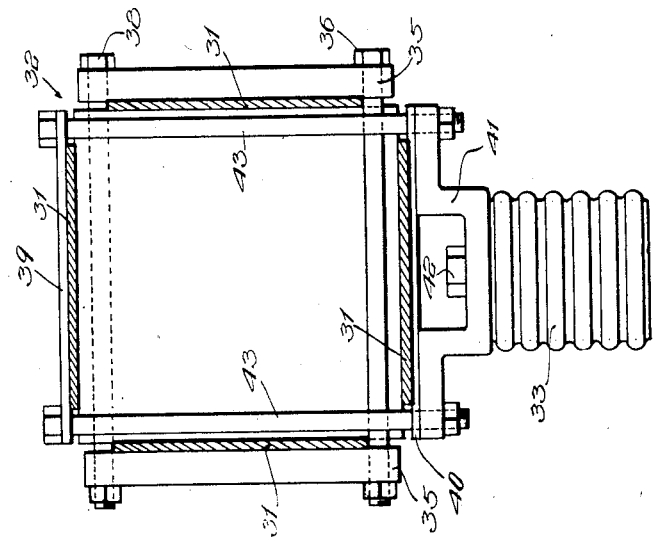

Patented Aug. 27, 1929.

1,726,077

UNITED STATES PATENT OFFICE.

TITUS G. LE CLAIR, OF CHICAGO, ILLINOIS.

BUS CONSTRUCTION.

Application filed March 26, 1927. Serial No. 178,562.

The present invention pertains to bus construction and more particularly to a bus supporting clamp especially adapted for use in connection with busses of the same general character as that disclosed and claimed in my co-pending patent application, Serial No. 178,561, filed March 26, 1927.

As pointed out in my co-pending application a tubular conductor performs ideally as a bus for carrying currents of high capacity. It has been found that in this type of bus the "skin effect" is at a minimum and that in multiple phase lines employing this type of bus the proximity effect is not so pronounced. The principal objection to the use of a tubular bus is the difficulty of mounting it, in addition to the difficulty of taking taps therefrom.

Now, I have found that a rectangular bus is for all practical purposes an efficient conductor of high capacity currents, and may be mounted with much less difficulty than a tubular bus.

I propose to provide a bus supporting clamp which will render practical the mounting of a polygonal or rectangular bus, of the character disclosed in my co-pending patent application. These clamps are disposed at intervals on insulators along the length of the bus and function to rigidly connect the bars comprising the bus contruction.

In accordance with the features of one modification of my invention, the clamp is used for supporting a rectangular bus comprising a plurality of bars of copper. The bars are properly spaced by rectangular iron spacers, on the sides of which the bars are firmly clamped by bolts. Certain of these bolts are also utilized to secure the clamped construction to a bus supporting insulator.

I have illustrated my novel clamp in connection with both multiple and single phase lines. When it is used in the multiple phase capacity, I preferably offset the clamps with respect to the insulators on each of the side phases, so as to increase the distance separating the side phases from the intermediate phase. This construction minimizes the tendency of the bars, facing each other on the adjacent phases, becoming heated. The clamp used on the intermediate phase line is not offset and may be used in connection with an isolated or single phase line.

Furthermore, the construction of my clamp is such that one of the copper sides of the rectangular bus may be omitted without interfering with the clamping together of the other three sides. Thus it will be evident that my clamp may also be used in connection with a three sided polygonal bus without any changes in its construction. Then too by spacing the edges of the bars from each other the air is permitted to circulate freely between the bars of the bus thus augmenting the cooling of the bus.

Another feature of my clamp construction resides in the fact that the clamp bolts do not pierce the bars comprising the rectangular bus. This enables a longitudinal movement of the bars of the bus relative to the clamps. Furthermore the clamp bolts do not even extend through perforations in the spacers. The bolts are disposed wholly outside of the dimensions of the spacers. These spacers merely serve as a construction against which the bars of the bus may be firmly clamped. It will be, therefore, apparent that I have provided a highly simple and efficient clamp. As a whole it permits of the bus being very economically mounted.

Other objects and advantages of my invention will more fully appear from the following detailed description taken in connection with the accompanying drawing, which illustrates several embodiments thereof, and in which:

Fig. 1 is an elevation partly in section of a three phase bus line provided with clamps built in accordance with the features of my present invention;

Fig. 2 is a side elevation of one of the clamps shown in Fig. 1;

Fig. 3 is an elevation partly in section of another form of clamp, showing it applied to a single phase bus line; and Fig. 4 is a side elevation of the construction shown in Fig. 3.

Referring now to the drawings in detail in which like reference numerals designate similar parts throughout the several views, and more particularly to Figs. 1 and 2, 10, 11, 12 and 13 designate the four sides of a polygonal or rectangular bus indicated generally by the reference character 15. Each side comprises a pair of spaced copper bars 14—14, which bars are separated by copper spacer 16. This spacer 16, as is evident from the illustrations in Figs. 1 and 2, extends merely the length of the clamping device designated generally by the reference character 18. These devices 18 are disposed at intervals along the length of the bus 15 and are each carried by a supporting insulator 17.

It will be evident from Fig. 1 that I have shown the invention applied to a three phase bus line. The side phase clamping devices are designated by the reference character 18—18, whereas the intermediate phase clamping device is designated by the reference character 18'. It will be observed that in the intermediate bus clamp construction the axis of the bus is in axial alignment with the vertical axis of the insulator 17. In each of the clamps associated with the side phase busses the longitudinal axis of the bus is not disposed in axial alignment with the vertical axis of the insulator, but on the contrary is offset with respect to the axis of the insulator, so as to increase the distance separating the bus from the intermediate bus line. This construction as will become more apparent hereinafter serves to minimize the heating of the sides of the bus due to the proximity effect.

Inasmuch as the clamps employed on all three phases are substantially alike it is thought that a description of one will suffice for all. Each clamp construction includes a spacing member 20, which may be made of cast iron. This member is disposed between the bars 14 of the bus and has formed in its ends two recesses, which constitute pockets 21. Each of these pockets is adapted to receive a vertical side of the rectangular bus comprising the two bars 14 and the spacer 16. The top and bottom of the spacer 20 are substantially flat and have disposed contiguous therewith the other sides of the rectangular bus. The four sides of the bus are strongly clamped to the spacer 20 by a plurality of clamping plates, which will now be described in detail.

The side bars of the bus are rigidly clamped in their respective pockets 21 by means of a pair of diametrically opposed clamping plates 23 and 24. These plates face each other and are connected by means of four parallel bolts 25. These bolts 25 do not extend through the spacer 20, but are disposed on the opposite sides of the spacer. That is to say, one pair of bolts 25 is disposed on one side of the spacer and the other pair of bolts is disposed on the other side of the spacer.

The bars 14 comprising the top and bottom sides of the bus are firmly clamped to the upper and lower ends of the spacer element 20 by means of a pair of diametrically opposed clamping plates 27 and 28, which are connected by four parallel bolts 29. The bolts 29 are also disposed outside of the dimensions of the spacer 20 and are disposed at right angles to the bolts at 25.

The edges of the bus bars are spaced from each other thus permitting the air to circulate freely in the space between the bus bars. This natural ventilation augments the cooling of the bus.

The lower plate 28 is suitably fastened to the upper end of the insulator 17, which is disposed in a vertical position. By connecting this plate directly to the insulator the number of parts required for mounting the bus is reduced to a minimum. It will, of course, be obvious that the insulator may be connected to any of the other three plates instead of the plate 28 without deviating from the features of my invention.

It is desirable in a multiphase bus line to mount the busses as close as practical in order to facilitate the making of connections thereto and the taking of taps therefrom as well as to reduce the so-called reactance. It has been found that if the phases are mounted too close the adjacent sides of the bus bar will tend to heat due to the so-called proximity effect. I have provided a construction wherein this effect can be minimized without the necessity of increasing the spaces separating the phases. This is accomplished by disposing the side bars of each bus in an offset position with respect to the top and bottom bars of the same phase. This arrangement tends to produce a more even distribution of the current in the various bars and minimizes the proximity effect due to the fact that the inner or near side bars are no closer to the adjacent phase than the top and bottom bars. Referring to Fig. 1, and more particularly to the bus shown on the left side of the view, it will be noted that the plate 24 is disposed flush with the ends of the top and bottom sides of the bus. This arrangement results in the axis of the spacing element 20 being disposed out of alignment with the axis of the insulator 17.

In Figs. 3 and 4, I have illustrated another modification of my novel bus supporting clamp, which is especially adapted for use in connection with an isolated phase bus line. In this construction the bus 30 comprises four sides, each of which includes a single copper bar 31. These bars are arranged in a polygonal or rectangular shape, and are properly spaced and supported by the clamping device designated generally by the reference character 32. This device 32 is in turn mounted upon a supporting insulator 33.

Positioned between the bars 31 are a pair of spacing members 34—34, which may be made of iron. These members are each rectangular in shape and they serve to properly space the bars 31. The bars 31 abut the sides of the spacers 34—34. The side bars 31—31 of the bus 30 are held in contact with the spacers 34—34 by means of a pair of diametrically opposed clamping plates 35—35. Each of these plates 35 is triangular in shape, as shown in Fig. 4, and is connected to the opposite plate by means of three bolts 36, 37, and 38. The upper bolt 38 extends between the spacers 34, whereas the bolts 36 and 37 are positioned on the outer sides of the spacers.

Positioned on top of the top bus bar 31 is a non-magnetic steel clamping plate 39, and positioned on the bottom of the bottom bus bar 31 is a similar plate 40. The plate 40 is disposed on top of a mounting member 41, which is secured to the top of the insulator 33 by means of the bolt 42. The top plate 39 is connected to the bottom plate 40, as well as to the member 41, by means of four vertical bolts 43. These bolts are disposed at right angles to the bolts associated with the plates 35—35.

Both forms of the clamp construction shown and described may be used to support three sided busses instead of rectangular busses. This may be accomplished by simply omitting one of the sides of the busses from the construction. It will be evident that even though one of the sides is omitted the construction of the clamp need not be altered or changed for supporting the other three sides of the bus.

My clamp construction is such that the bus bars are held accurately in position, and yet, they are permitted to slip longitudinally, if necessary, under expansion and contraction.

Also in a multiphase or bus line the adjacent clamping devices may be connected by a bracing insulator. This arrangement will materially increase the rigidity of the mounting for the busses.

Now I desire it understood that, although I have illustrated and described in detail, the preferred forms of my invention, the invention is not to be thus limited, but only in so far as defined by the scope and spirit of the appended claims.

I claim:—

1. A supporting construction for a tubular bus composed of a plurality of bars arranged so as to give the bus a polygonal cross section, comprising a spacing member disposed within the dimensions of the bus, and means disposed outside of the bus for clamping the bars thereof to said spacing member, said member including a recessed portion forming a pocket for receiving one of said bars.

2. In a supporting construction for a side phase bus of a multiphase line, a support, and a mounting carried by the support to which the bus is connected, said mounting including clamping means disposed in an offset position with respect to the axis of the support.

3. In a supporting construction for a multibar tubular bus, having a polygonal cross section and comprising the side phase of a multiphase line, an insulator, and clamping means for clamping the bars of the bus to the insulator, said clamping means including a mounting carried by the insulator and the axis of said bus and clamping means being offset with respect to the axis of said insulator.

4. In a supporting construction for a multibar tubular bus having a polygonal cross section, a support, and clamping means for clamping the bars of the bus to the support, one of said bars being disposed within the space between the two bars adjacent thereto, and the bar opposite said one bar being disposed outwardly beyond the space between the two bars adjacent the first mentioned bar.

5. A three phase bus comprising, three busses one for each phase, and three supporting insulators one for each bus, the central bus being mounted centrally at its supporting insulator and the other two busses being offset outwardly of the centers of their supporting insulators.

6. A single bus comprising three or more electrically connected sets of spaced parallel bars, the sets of bars being angularly disposed with respect to one another.

7. A single bus comprising three or more electrically connected sets of spaced parallel bars, the sets of bars being angularly disposed with respect to one another to constitute the sides of a polygon.

In witness whereof, I hereunto subscribe my name this 23rd day of March, 1927.

TITUS G. LE CLAIR.